March 9, 1943.  R. L. SMITH  2,313,593
TRIPOD CARRYING CASE
Filed Oct. 15, 1940
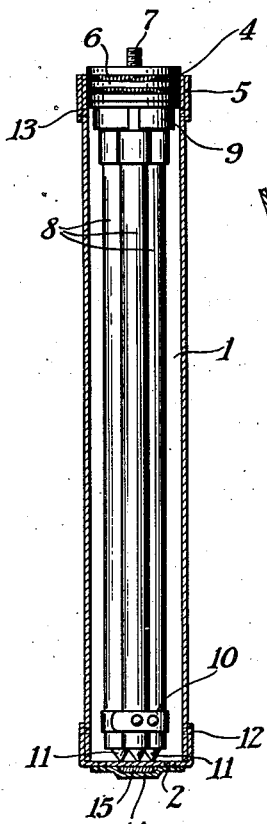
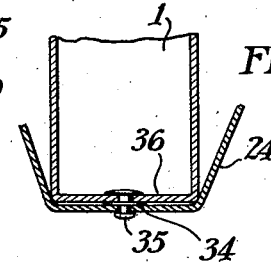
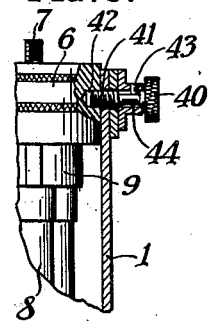
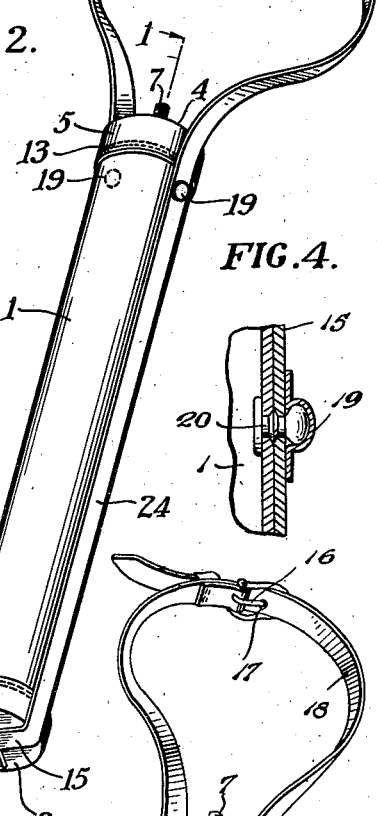
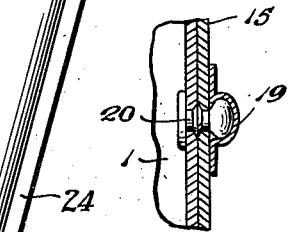
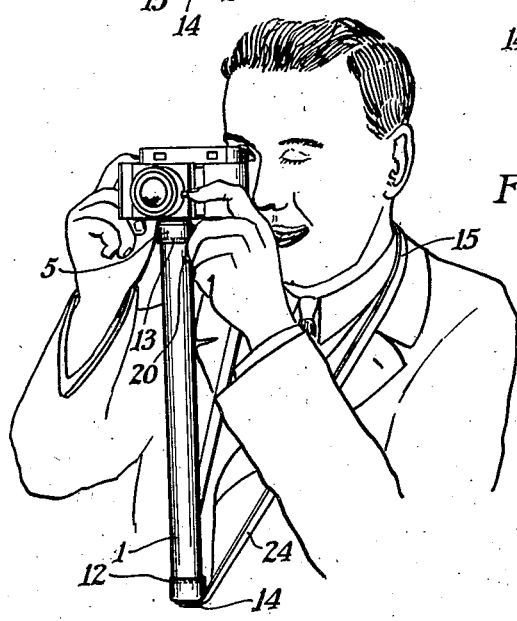
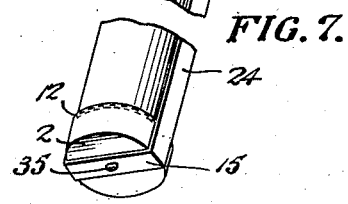
ROLAND L. SMITH
INVENTOR
BY
ATTORNEYS Patented Mar. 9, 1943

2,313,593

UNITED STATES PATENT OFFICE 2,313,593

TRIPOD CARRYING CASE

Roland L. Smith, Belmont, Mass., assignor to Eastman Kodak Company, Rochester, N. Y., a corporation of New Jersey Application October 15, 1940, Serial No. 361,228

2 Claims. (Cl. 224—5)

This invention relates to photography and more particularly to a combined carrying case and support for a camera and tripod.

One object of my invention is to provide a carrying case in which a standard type of tripod can be placed and carried. Another object of my invention is to provide a carrying case for a standard type of tripod so arranged that the carrying case may form a part of a camera supporting structure including the tripod inside of the case. Still another object of my invention is to provide a case for supporting a tripod which provides a strap by which the case may be carried in the usual manner, the strap and case having latch elements which may be released so that the carrying case may form part of a camera support when the strap is passed around the neck of a camera operator. Other objects will appear from the following specification, the novel features being particularly pointed out in the claims at the end thereof.

Coming now to the drawing in which like reference characters denote like parts throughout:

Fig. 1 is a section taken on line 1—1 of Fig. 2, showing my improved form of tripod carrying case with a typical tripod shown in the case in elevation.

Fig. 2 is a perspective view of my improved carrying case with the strap and latch elements arranged in position to carry the case in the normal manner.

Fig. 3 is a perspective view of the carrying case and strap arranged to position a camera mounted on the tripod remaining in the case.

Fig. 4 is an enlarged fragmentary view of latch elements for attaching the carrying strap to the upper portion of the tripod case.

Fig. 5 is a fragmentary detail section showing a modified form of the means for attaching the strap to the carrying case.

Fig. 6 is a fragmentary detail section showing a means for attaching the tripod to the camera carrying case.

Fig. 7 is a perspective view similar to Fig. 2 but showing a slightly different embodiment of my invention.

In accordance with a preferred embodiment of my invention I prefer to form a tripod carrying case of a tubular member 1, which is provided with a closed bottom wall 2 and which is open at the top 4. If desirable, a reinforcing ring or collar 5 may be passed around the upper end of the case to insure a reasonably tight fit with the head 6 of any standard tripod. Such a tripod includes a tripod screw 7 and, in the form illustrated, a plurality of legs 8, each of which is hinged to the base 9 of the tripod top 6.

The legs may be held together by a strap 10, and they may be of the usual telescopic variety which can be extended when the tripod is removed from the case and each leg may terminate in pointed feet 11.

While I prefer to make my carrying case of substantial leather, it is obvious that other materials can be used, if desired. When made of leather, however, the bottom wall 2 is attached to the tubular member 1, as by stitching at 12, and the collar 5 may be stitched at 13 to fasten the collar around the open top of the tubular member.

The bottom wall 2 may be provided with a loop 14 which serves as a means for attaching a strap 15 to the carrying case, this strap being provided at one end with a buckle 16 which is adapted to engage in aperture 17 in the other end 18 of the strap to form a loop. The strap is also provided with a pair of latch elements 19 so positioned that they may engage complementary-shaped latch elements 20 which are disposed oppositely on the upper end of the tubular member 1 near the open top thereof. The position of the latch elements 19 is such that that portion of the strap 24 which lies against the tubular member may be drawn tight when the latch elements 19 and 20 on both sides of the carrying case are engaged to provide a loop-like handle for carrying the carrying case in the normal manner.

It frequently happens, however, that an operator may desire to use his tripod to steady a camera for taking a picture without removing it from a case. When he desires to do this, the latch elements 19 may be unlatched from the latch elements 20 so that the strap will engage the case across the bottom wall 2 and the case may turn or pivot about the strap so that the carrying case with the tripod inside may be moved to the position shown in Fig. 3. This forms quite a firm support for a camera and by adjusting the length of the strap loop, the case can be positioned to hold the camera at eye level, as shown. After using the tripod and carrying case in this manner, it can easily be withdrawn from the open top 4 of the case and used with the legs 8 opened to the usual position, if this should be desirable. When so in use, the tubular case 1 can hang from the strap 14 about the neck of the user and thus be out of the way while the tripod is being used.

When it is desired to carry the tripod again, it may be placed in the open top 4 of the case 1 and the latch elements 19 and 20 may be engaged so that the strap 15 may again be used as a handle for carrying the case.

Referring to the modified form of my invention illustrated in Figs. 5 and 7, I have found it often desirable to pivotally attach the tripod carrying case 1 to the carrying strap 24 instead of to attach the strap 24 by passing it through the strap loop 14 as shown in Fig. 2. Accordingly, in Fig. 5, the strap 24 is shown as being supported at 34 by means of a stud 35 permanently attached to the bottom 36 of the carrying case. This permits an operator to readily turn the camera when used as a neck tripod as shown in Fig. 3, since the entire case 1 may swing about the pivotal connection at 35.

It is also frequently desirable to attach the tripod to the case, this being particularly useful when it is desired to carry the camera and the tripod as one unit. In order to do this, I have provided the camera carrying case 1 (as indicated in Fig. 6) with a set screw 40, having a thread 41 for engaging a threaded socket 42 in the tripod head 6, so that when desired, this screw may be used to quickly attach the tripod to the case so that it cannot fall out, even though the case is turned upside down. I prefer to provide a pin 43 in a slot 44 which will limit the outer movement of the screw 40 to just a distance sufficient to permit the tripod to be withdrawn from the case.

What I claim as my invention and desire to be secured by Letters Patent of the United States is:

1. A carrying case for tripods comprising a tubular member of a length to receive a tripod with a screw for attaching a camera to the tripod projecting from the open end thereof, a carrying strap forming a loop longer than the length of the tubular member, a closed bottom wall for the tripod case, means for supporting the strap from the bottom wall of the exposed side and centrally of the tripod case, oppositely disposed strap latch elements positioned near the open top of the tripod case oppositely disposed with respect to each other, strap latch elements carried by the strap spaced to engage the strap latch elements on the case when the strap is drawn taut longitudinally of the case from the bottom thereof, whereby the latched strap may be used as a handle for carrying the case, said strap also serving to support the tripod about the neck of a user when said strap latch elements are disengaged to support the case solely from the bottom thereof.

2. A carrying case for tripods comprising a tubular member of a length to receive a tripod with a screw for attaching a camera to the tripod projecting from the open end thereof, a carrying strap adapted to form a loop longer than the length of the tubular member, a closed bottom wall for the tripod case, a pivot carried by the closed bottom wall of the tripod case and passing through the carrying strap for attaching the strap to the bottom wall of the case and permitting pivotal movement of the case relative to the strap, oppositely disposed strap latch elements positioned near the open top of the tripod case spaced on opposite portions of the carrying case, strap latch elements carried by the strap spaced to engage the strap latch elements on the case when the strap is drawn about the outside walls of the case, whereby the latched strap may be used as a handle for carrying the case and the strap may also serve to support the tripod about the neck of a user when said strap latch elements are disengaged to support the case solely from the bottom thereof.

ROLAND L. SMITH.